C. M. O'HARA.

Paper File.

No. 123,288. Patented Jan. 30, 1872.

Witnesses
Walter O'Hara
George Beismann

Charles M. O'Hara
Inventor 123,288

UNITED STATES PATENT OFFICE.

CHARLES M. O'HARA, OF NEW YORK, N. Y.

IMPROVEMENT IN PAPER-FILES.

Specification forming part of Letters Patent No. 123,288, dated January 30, 1872.

*To all whom it may concern:*

Be it known that I, CHARLES M. O'HARA, of the city, county, and State of New York, have invented a new and Improved File for holding bills, bank-notes, letters, and other paper matter; and I do hereby declare that the following is a full, clear, and exact description thereof, which will enable others skilled in the art to make and use the same, reference being had to the accompanying drawing forming part of this specification.

The invention consists in the peculiar method of using doubled rubber bands in combination with certain metallic devices, operating with a pair of covers. Two of the said bands are connected to one of the aforesaid covers by means of a pair of metallic links, adjusted to and working in a pair of brackets or metallic bearings fastened to edge of said cover. The extremity of each doubled band is also furnished with a metallic link, which, by aid of a flat-shaped metallic tag or handle, is made to fasten and unfasten on a curved plate or hook.

Figure 1:
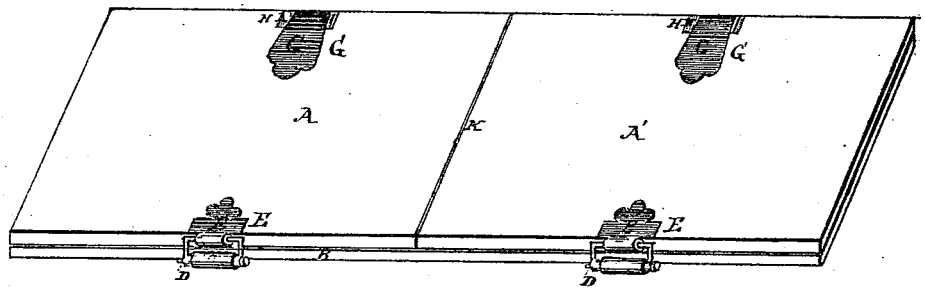
Figure 2:
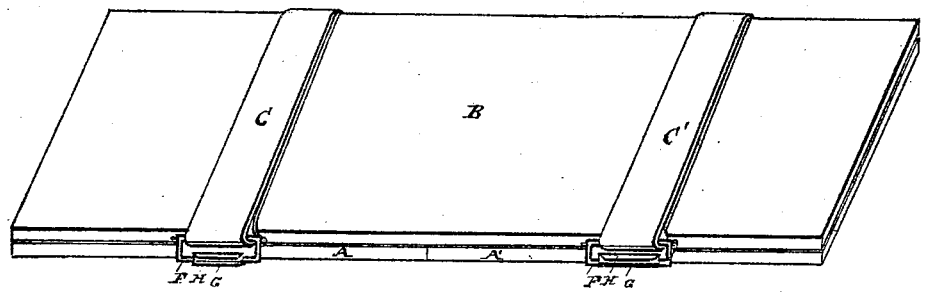
Figure 3:
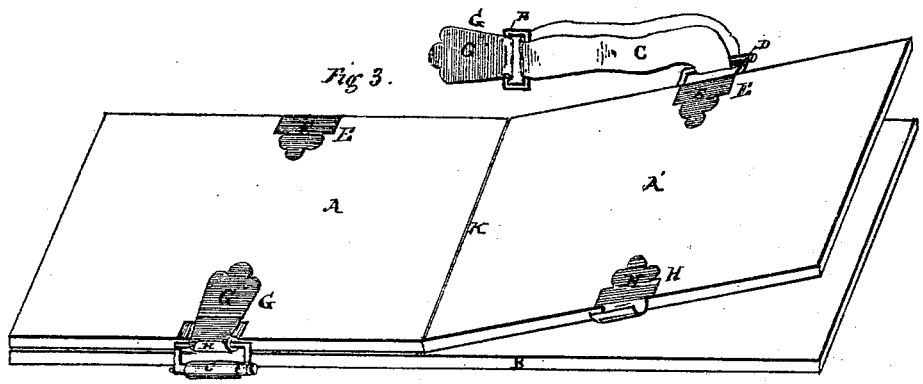
Figure 4:
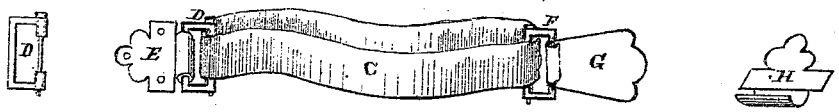

In the accompanying sheet of drawing, Figure 1 shows the front side of the file, or that side on which the metallic bearings are fastened. Fig. 2 shows the back of the file, on which the rubber bands press and bind the two covers together. Fig. 3 is also a front view of the file, showing one band detached from its corresponding hook, and half the upper cover, partially opened, on a hinge placed across the middle of said cover. Fig. 4 shows detail views of the manner in which the doubled rubber band is connected with its various appendages.

In the several letters in drawing, A A' is the front or upper cover. B is the back or under cover of the file. C C' are the doubled rubber bands which hold the two covers together. D F are the two links which connect the band C to the bracket E and the tag or handle G, as shown in Fig. 4. H is the hook which secures each of the rubber bands in its position by means of the link F and tag G, as shown in Fig. 2. K is the hinge bisecting the cover A A', as shown in Figs. 1 and 3.

It will be perceived that when bills and other documents are placed between the covers A A' and B the rubber bands C C' are stretched over only one of the covers, and their tension preserved by adjusting the links F F on their corresponding hooks H H, as shown in Fig. 2. It will be also apparent that ready access can be had to any of the papers thus filed by detaching one of the links from its corresponding hook and turning down the half section of the cover A A', as shown in Fig. 3.

I am aware that bands of rubber have been used, in combination with boards, for filing papers; these I disclaim. I am also aware that covers of pasteboard have been used, in combination with rubber straps or bands furnished with conical knobs and other metallic fastenings; these I also disclaim.

I claim as my invention—

The combination of the doubled rubber band C with the links D and F, operating with covers A A' and B by means of the bracket E, the hook H, and the tag G, in the manner herein described, and for the purpose specified.

The above specification signed by me this 4th day of April, 1871.

CHARLES M. O'HARA.

Witnesses:
WALTER O'HARA,
GEORGE BEISMANN.